Oct. 27, 1959 H. W. KOHLER 2,910,586

GENERATION OF WAVES HAVING ACCURATELY PREDETERMINED PHASE-SETTINGS

Filed Sept. 17, 1957 2 Sheets-Sheet 1

INVENTOR
HANS W. KOHLER

BY
W. E. Thibodeau, T. J. Lynch, J. E. McGee and J. P. Edgerton

INVENTOR
HANS KOHLER

BY
W. E. Thibodeau, T. J. Lynch, F. E. McGee and J. D. Edgerton

United States Patent Office 2,910,586

Patented Oct. 27, 1959

2,910,586

GENERATION OF WAVES HAVING ACCURATELY PREDETERMINED PHASE-SETTINGS

Hans W. Kohler, Washington, D.C., assignor to the United States of America as represented by the Secretary of the Army Application September 17, 1957, Serial No. 684,629

3 Claims. (Cl. 250—27)

(Granted under Title 35, U.S. Code (1952), sec. 266)

The invention described herein may be manufactured and used by or for the Government for governmental purposes without the payment to me of any royalty thereon.

The invention relates to the generation of waves having accurately predetermined phase-settings.

In various applications (e.g. in computer circuitry) it is of considerable importance to be able to accurately set the phase as well as the amplitude of a wave or a group of waves with respect to one another. In the prior art the phase of a wave could be set, but the accuracy with which such phase-settings could be made was quite limited. In the present invention apparatus and methods are provided which permit the phase of a wave, or a group of waves, to be set to almost any desired degree of accuracy. This is accomplished by a novel application of digital counting techniques.

An object of this invention is to provide means for producing a square wave having an accurately predetermined phase-setting.

Another object is to provide means for producing a sine wave voltage having an accurately predetermined phase-setting.

A further object of this invention is to provide means for producing a plurality of square waves, each having an accurately predetermined phase-setting.

Still another object is to provide means for producing a plurality of sine wave voltages, each having an accurately predetermined phase-setting.

The specific nature of the invention, as well as other objects, uses, and advantages thereof, will clearly appear from the following description and from the accompanying drawing, in which.

Figures 1, 4:
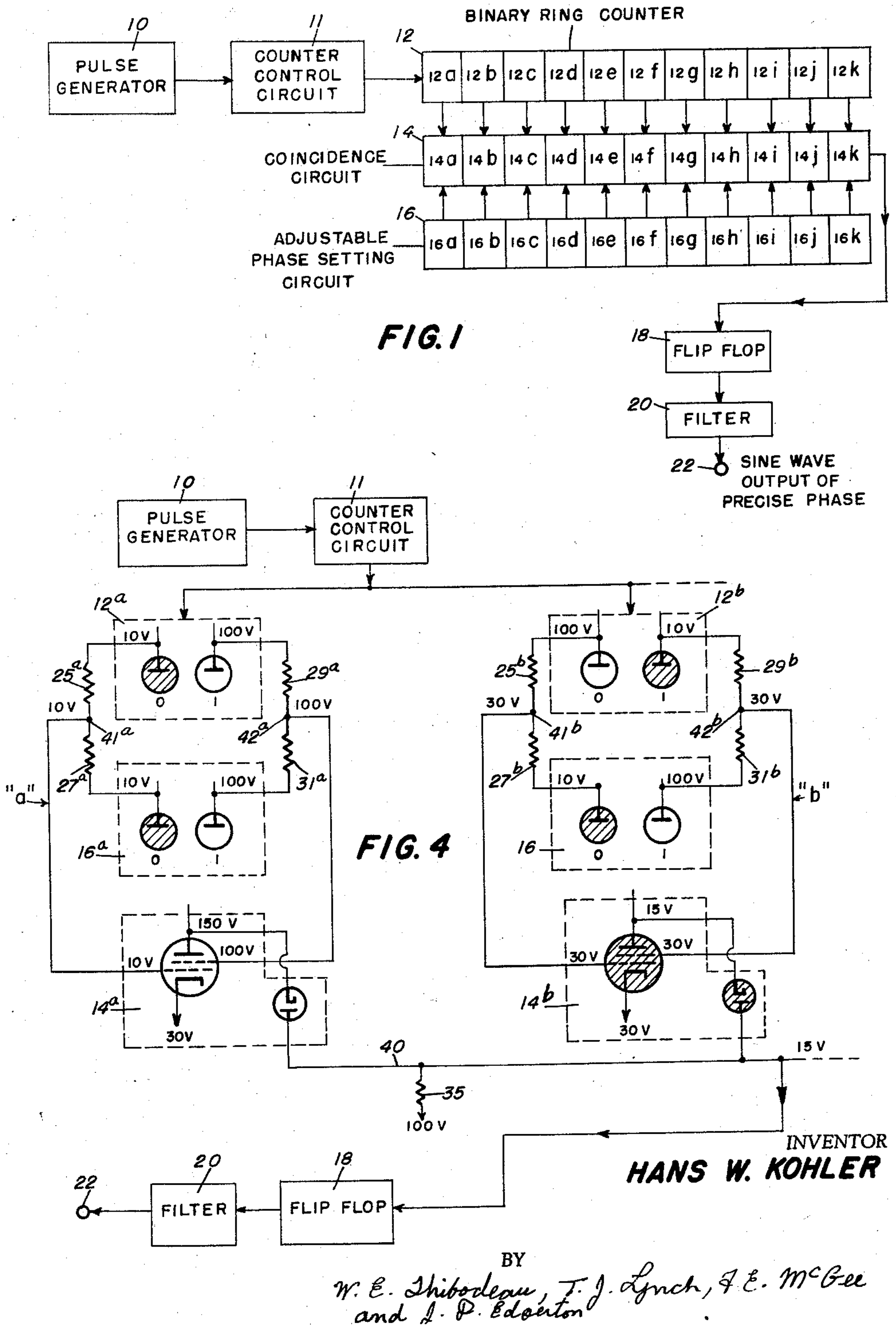
Figure 1 is a block diagram of the basic phase-setting technique in accordance with the invention.
Figure 4 is a circuit and block diagram indicating specific means which can be used for the binary ring counter, the coincidence circuit, and the phase-setting circuit shown in block form in Figures 1–3.

In Figure 1, a pulse generator 10 feeds a counter control circuit 11 which is used to repeatably step a binary ring counter 12, through a predetermined range. The binary ring counter 12 may have any desired number of stages 12*a*, 12*b* . . . 12*k*, the accuracy of phase-setting being dependent upon the number of stages 12*a*, 12*b* . . . 12*k* used. Suppose it is desired to set the phase of a vector to the nearest tenth of a degree. For this accuracy, the counter needs to cover 180 degrees, only, with each degree subdivided into 10 steps. Settings between 180 and 360 degrees may be obtained by properly reversing the outputs obtained for settings between 0 to 180 degrees. The total range required of the counter 12 would be from 0 to 1799, with 1800 coinciding with 0. The counter control circuit 11, therefore, would repeatably step the binary ring counter 12 through a range from 0 to 1799 at a stepping rate determined by the pulse generator 10. Such a control circuit 11 is well known in the art. For this range an 11-stage binary counter 12 is required as shown in Figure 1 (stages 12*a*, 12*b* . . . 12*k*). The pulse generator 10 may, for example, provide a stepping rate of 1 megacycle. If it is desired to set the phase of a vector to the nearest hundredth of a degree, a counter having a range from 0 to 18,000 would be used. It can thus be seen that almost any degree of accuracy of phase-setting may be obtained by increasing the range of the binary ring counter 12 accordingly.

An adjustable phase-setting circuit 16 has 11 stages 16*a*, 16*b* . . . 16*k*, each of which can be independently set to a 0 or a 1 so that any binary number can be made to appear on the adjustable phase-setting circuit 16. Each corresponding stage of the counter 12 and the phase-setting circuit 16 are fed to a corresponding stage of a coincidence circuit 14 also having 11 stages 14*a*, 14*b* . . . 14*k*. When all of the stages of the counter 12 and phase-setting circuit 16 match, the coincident circuit 14 will produce an output pulse. Assume, for example, that a phase lag of 57.3 degrees is desired. The adjustable phase-setting circuit 16 is adjusted to correspond to a binary number 01000111101, which is 573 in binary form, by setting the stages 16*a*, 16*b* . . . 16*k* to 0's and 1's accordingly. Each time the counter 12 reads 01000111101 in its travel between 0 and 1799 so that it matches this setting on the phase-setting circuit 16, an output pulse will be produced by the coincidence circuit 14.

The output of the coincidence circuit 14 is fed to a conventional flip-flop 18 which flips and flops with each pulse from the coincidence circuit 14 so that a symmetrical square wave (equal on and off periods) displaced in phase (57.3 degrees in the above example), will be obtained from the flip flop 18. For a range of 1800 steps and a stepping rate at 1 megacycle per second, the square wave obtained from the flip-flop 18 will have a repetition rate of $$\frac{10^6}{2\times 1800}$$

equals approximately 278 cycles per second. If the phase lag desired is between 180 and 360 degrees, the initial position of the flip flop 18 is reversed.

The above description has shown that it is possible to produce a symmetrical square wave having an accurate phase setting. The stepping rate and the range of the binary ring counter 12 determines the repetition rate of this square wave, and the range of the counter 12 determines the accuracy at which the phase may be set. If this square wave at the output of the flip flop 18 is now passed to a filter 20, which is tuned to the fundamental frequency of the square wave, a sine wave voltage vector will be produced at the output terminal 22 having exactly the same phase-setting as the square wave. Thus, the system shown in Figure 1 enables one to produce a sine wave voltage vector having a predetermined phase with almost any desired degree of accuracy. It should be noted that the filter 20 may also be tuned to other harmonics where a higher frequency is desired.

Figure 2:
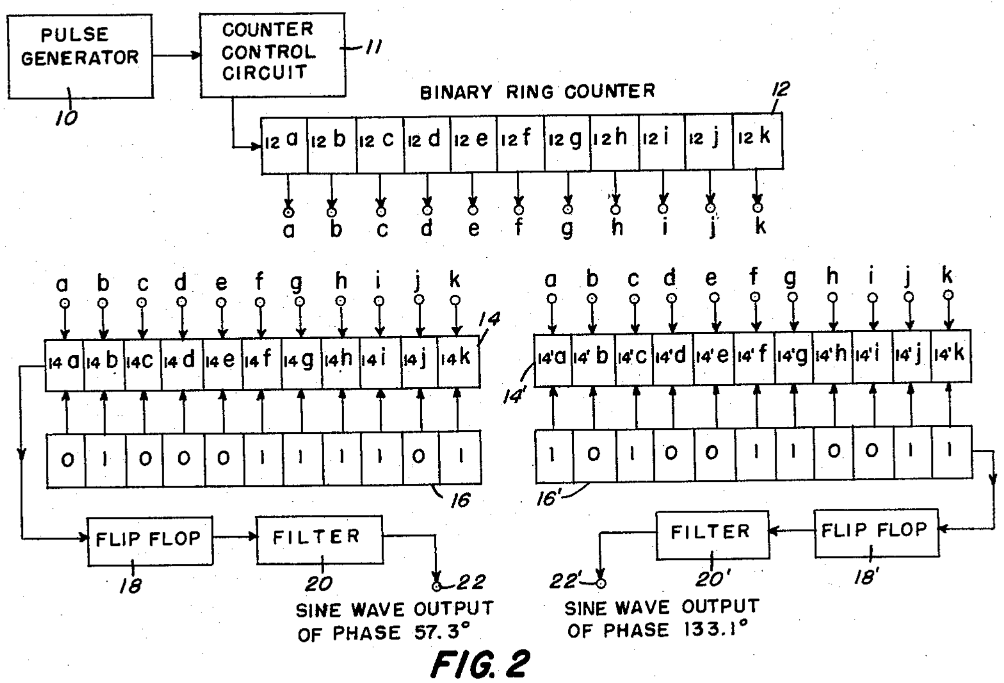
Figure 2 is a block diagram showing how the basic phase-setting technique can be extended to set the phase of two vectors.

Figure 2 shows how the basic phase-setting technique of Figure 1 can be expanded to set the phase of two vectors. In this case, the counter 12 feeds a second coincidence circuit $14^1$ in parallel with the first coincidence circuit 14. The terminals *a*, *b*, . . . *k* are the same in various parts of Figure 2 and are intended to represent this parallel connection. Also provided is a second adjustable phase-setting circuit $16^1$, a second flip flop $18^1$, a second filter $20^1$, and a second output terminal $22^1$, all of which perform the same function as their counterparts 16, 18, 20 and 22. For illustrative purposes, the first phase-setting circuit 16 is shown set for 01000111101, which is 573 in binary form and corresponds to a phase-setting of 57.3 degrees, and the second phase-setting circuit $16^1$ is shown set for 10100110011 which is 1331 and corresponds to a phase-setting of 133.1 degrees. At the output terminals 22 and $22^1$, therefore, will be obtained sine wave voltage vectors having phases of 57.3 and 102.3 degrees respectively. As will be understood by those skilled in the art, a phase-setting of 237.3 degrees (180.0+57.3) can be obtained from the 57.3 degree setting of the phase-setting circuit 16 by reversing the initial position of the flip flop 18.

Figure 3:
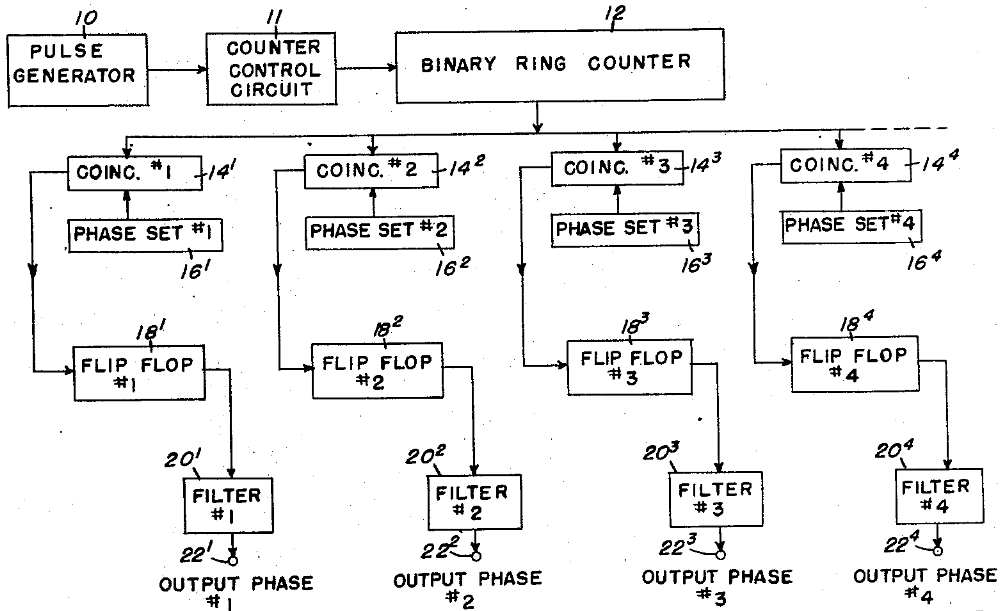
Figure 3 is a block diagram showing how the basic phase-setting technique can be extended to set the phase of any number of vectors.

Figure 3 shows how the phase-setting technique of this invention can be extended to set the phase of any number of vectors, four channels being shown for illustrative purposes.

Figure 4 indicates one example of specific means which can be used for the stages of the counter 12, the coincidence circuit 14, and the phase setting circuit 16 shown in block form in Figures 1–3. For a typical step of the counter 12, stage "*a*" comprising **12*a*, 14*a*, and 16*a*** are shown in match and stage "*b*" comprising **12*b*, 14*b*, and 16*b*** are shown out of match.

The binary ring counter stages **12*a* and 12*b*, and the phase-setting stages 16*a* and 16*b* may comprise two-tube stages of the flip-flop type. Each of these flip-flops is designed so that when a tube is conducting, as indicated by the tube being cross-hatched, its plate is at 10 volts; on the other hand, when a tube is non-conducting the flip-flop is designed so that its plate is at 100 volts. One tube of each of the flip-flops 12*a*, 12*b*, 16*a*, and 16*b*** is chosen to represent "0" while the other tube is chosen to represent "1." For stage "*a*" equal resistors **25*a* and 27*a* are connected between the plates of the "0" tubes of flip-flops 12*a* and 16*a*, and equal resistors 29*a* and 31*a* are connected between the plates of the "1" tubes of flip-flops 12*b* and 16*b*. Equal resistors 25*b*, 27*b* and 29*b*, 31*b***, are similarly connected in stage "*b*" between the plates of the "0" and "1" tubes of the flip-flops **12*b* and 16*b***.

In stage "*a*," the junction **41*a* between the resistors 25*a* and 27*a* is connected to one grid of a dual control grid tube forming part of the coincidence stage 14*a*, and the junction 42*a* between the resistors 29*a* and 31*a* is connected to the other grid of the dual control grid tube of stage 16*a***. Likewise for stage "*b*" the junction **41*b* between resistors 25*b* and 27*b*, and the junction 42*b* between resistors 29*b* and 31*b*, are connected to the two grids of a second dual control grid tube forming part of the coincidence stage 14*b*. The stages 14*a* and 14*b* are designed so that each dual grid tube will conduct only when both of its grids have a voltage which is greater than the 30-volt bias on its cathode. Stages 14*a* and 14*b*** are further designed so when the tube is conducting, as indicated by the tube being cross-hatched, its plate is at 15 volts; on the other hand when the tube is non-conducting, its plate is at 150 volts.

Each of the coincidence stages **14*a* and 14*b* is provided with a diode having its cathode connected to the plate of the dual control grid tube and its plate connected to a common lead 40 to which the plates of all such diodes are connected. A voltage of say 100 volts is applied to this common lead 40 through a relatively high resistor 35. It is evident that as long as one dual control grid tube is conducting, the voltage at lead 40** will remain at 15 volts.

When the flip-flops match as do **12*a* and 16*a*** of stage "*a*," the voltages at junctions **41*a* and 42*a* will be 10 volts and 100 volts respectively, depending upon whether the "0's" or the "1's" are conducting. In Figure 4, the "0's" are shown conducting so that junction 41*a* will be at 10 volts and junction 42*a* will be at 100 volts. The voltages applied to the grids of the dual control grid tube of 14*a* will thus be 10 volts and 100 volts. For this condition the dual control gride tube of 14*a* will be non-conducting and its plate will be at 150 volts. The diode of 14*a***, therefore, will not conduct.

When the flip-flops do not match as is the case for **12*b* and 16*b*** of stage "*b*," the voltages at junction **41*b* and 42*b* will be 55 volts. Therefore, 55 volts will tend to be applied to both grids of the dual control grid tube of 14*b* causing it to be conducting so that 15 volts appears at its plate. The voltages on these grids will drop to somewhere around the bias voltage of 30 volts because of the grid currents drawn. The diode of 14*b* will thus conduct holding the lead 40** at 15 volts.

The counter control circuit 11, connected to the binary counter stages **12*a* and 12*b*, places these stages in the proper position ("1" or "0") for each step of the counter 12. This may be accomplished by means well known in the art. Figure 4 shows the positions of stages 12*a* and 12*b* at a typical step. Each of the phase-setting stages 16*a* and 16*b*** is designed so as to be adjustable to any desired position. This may also be accomplished by means well known in the art. A typical setting is shown in Figure 4. Although only two stages "*a*" and "*b*" are shown, it is obvious that the circuitry shown in Figure 4 can be extended to any number of stages.

Each time the counter 12 arrives at a step where all stages match (as at "*a*" for example) none of the diodes (such as in **14*a* and 14*b*) will conduct causing the voltage on the lead 40 to rise towards 100 volts. This rising voltage may be used to trigger the flip-flop 18**.

It has been shown that, by means of this invention, square waves and sine waves can be produced having a predetermined phase with any desired degree of accuracy. The illustrative examples of Figures 1–4 are not intended to limit the scope of this invention and many other applications and uses will readily be apparent to those skilled in the art. For example, a very accurate phase meter or phase comparator can be built using this technique.

It will be apparent that the embodiments shown are only exemplary and that various modifications can be made in construction and arrangement within the scope of the invention as defined in the appended claims.

I claim as my invention:

1. Means for producing a sine wave having an accurately predetermined phase-setting, said means comprising in combination: a binary ring counter having a plurality of stages, counter control means connected to said counter for repeatably stepping said counter through a predetermined range at a predetermined rate, each step of said predetermined range corresponding to a predetermined phase angle, an adjustable phase-setting circuit having the same plurality of stages as said counter, each of said counter stages corresponding to one phase-setting circuit stage, each of said counter and phase-setting stages being adapted to be in either of two positions, said counter stages changing their positions as said counter repeatably steps through its range, and each of said phase-setting stages being adjustable to either of the two positions, said phase-setting stages being set to match a predetermined counter step corresponding to a predetermined phase angle, a coincidence circuit having the same plurality of stages as said counter and said phase-setting circuit, each pair of corresponding counter and phase-setting stages being connected to one coincidence stage, said coincidence circuit producing an output pulse each time a counter step is such that the positions of all the counter stages match the positions set on their corresponding phase-setting stages, flip-flop means connected to the output of said coincidence circuit, said flip-flop means converting the output pulses from said coincidence circuit into a symmetrical square wave, and filter means tuned to the repetition frequency of said square wave for converting said square wave into a sine wave at said repetition frequency.

2. The invention in accordance with claim 1 wherein each counter and phase-setting stage is of the flip-flop type, and wherein each coincidence stage includes a dual control grid tube having one grid connected to a counter stage and the other grid connected to the corresponding phase-setting stage.

3. Means for producing a plurality of sine waves having accurately predetermined phase-settings, said means comprising in combination: the means defined by claim 1; a plurality of coincidence means connected in parallel with the first coincidence means; and a plurality of adjustable phase-setting means, flip-flop means, and filter means, each being connected to one coincidence means in the same way as the first adjustable phase-setting means, flip-flop means, and filter means are connected to the first coincidence circuit.

References Cited in the file of this patent

UNITED STATES PATENTS

| | | |
|---|---|---|
| 2,615,127 | Edwards | Oct. 21, 1952 |
| 2,641,696 | Woolard | June 9, 1953 |
| 2,774,534 | Dunn | Dec. 18, 1956 |
| 2,796,551 | Mackta | June 18, 1957 |
| 2,842,663 | Eckert et al. | July 8, 1958 |